March 23, 1954 F. H. OSBORNE 2,673,089

AUTOMATIC PHONOGRAPH FOR TWO-SPEED RECORDS

Filed March 8, 1949 4 Sheets-Sheet 1

INVENTOR.
FRED H. OSBORNE.
BY
Lockwood, Goldsmith & Galt.
ATTORNEYS.

AUTOMATIC PHONOGRAPH FOR TWO-SPEED RECORDS

Filed March 8, 1949

INVENTOR.
FRED H. OSBORNE.
BY Lockwood, Goldsmith & Galt,
ATTORNEYS.

INVENTOR.
FRED H. OSBORNE.
BY
Lockwood, Goldsmith & Galt.
ATTORNEYS.

March 23, 1954 F. H. OSBORNE 2,673,089

AUTOMATIC PHONOGRAPH FOR TWO-SPEED RECORDS

Filed March 8, 1949 4 Sheets-Sheet 4

INVENTOR.
FRED H. OSBORNE.
BY
Lockwood, Goldsmith & Galt.
ATTORNEYS.

Patented Mar. 23, 1954

2,673,089

UNITED STATES PATENT OFFICE 2,673,089

AUTOMATIC PHONOGRAPH FOR TWO-SPEED RECORDS

Fred H. Osborne, Snyder, N. Y., assignor to The Rudolph Wurlitzer Company, Chicago, Ill., a corporation Application March 8, 1949, Serial No. 80,280

3 Claims. (Cl. 274—9)

This invention relates to an automatic phonograph, particularly a phonograph capable of automatically changing and playing records of different physical characteristics and playing speeds.

The present day and more modern disk records are provided with centering apertures of different diameters and carry recordings to be reproduced at different rotative speeds. For example, one such record known as the "Columbia Microgroove" record which has a seven inch diameter, is provided with the usual centering aperture of approximately $\frac{5}{16}$ of an inch diameter, and the recording thereon is reproduced at a turntable speed of 33⅓ R. P. M. A corresponding seven inch record is known as the "RCA Victor" record having a centering aperture of 1½ inch diameter with a reproducing turntable speed of 45 R. P. M.

It is the object of this invention to provide an automatic phonograph which will reproduce either of the above type of records intermingled and irrespective of their different physical characteristics and reproducing speeds. Thus, it is the purpose of the invention to permit the commingling of both types of records in the magazine for automatic reproduction.

Another feature of the invention is to provide an automatic phonograph which will receive both types of record intermingled in its magazine, will transfer a selected record of either type from the magazine to the turntable and reproduce it automatically.

The invention more particularly lies in the provision of a feeler element actuated in accordance with a physical characteristic of a record or its holder to establish its prescribed turntable speed through a speed changing mechanism driven by the turntable motor. For example, a record having a physical characteristic of a relatively large centering aperture will be driven at 45 R. P. M., whereas a record having a physical characteristic of a relatively smaller or standard centering aperture will actuate the feeler element to shift the speed changing mechanism for rotating the turntable at 33⅓ R. P. M.

The full nature of the invention will be understood from the accompanying drawings and the following description and claims:

Figures 1, 6:
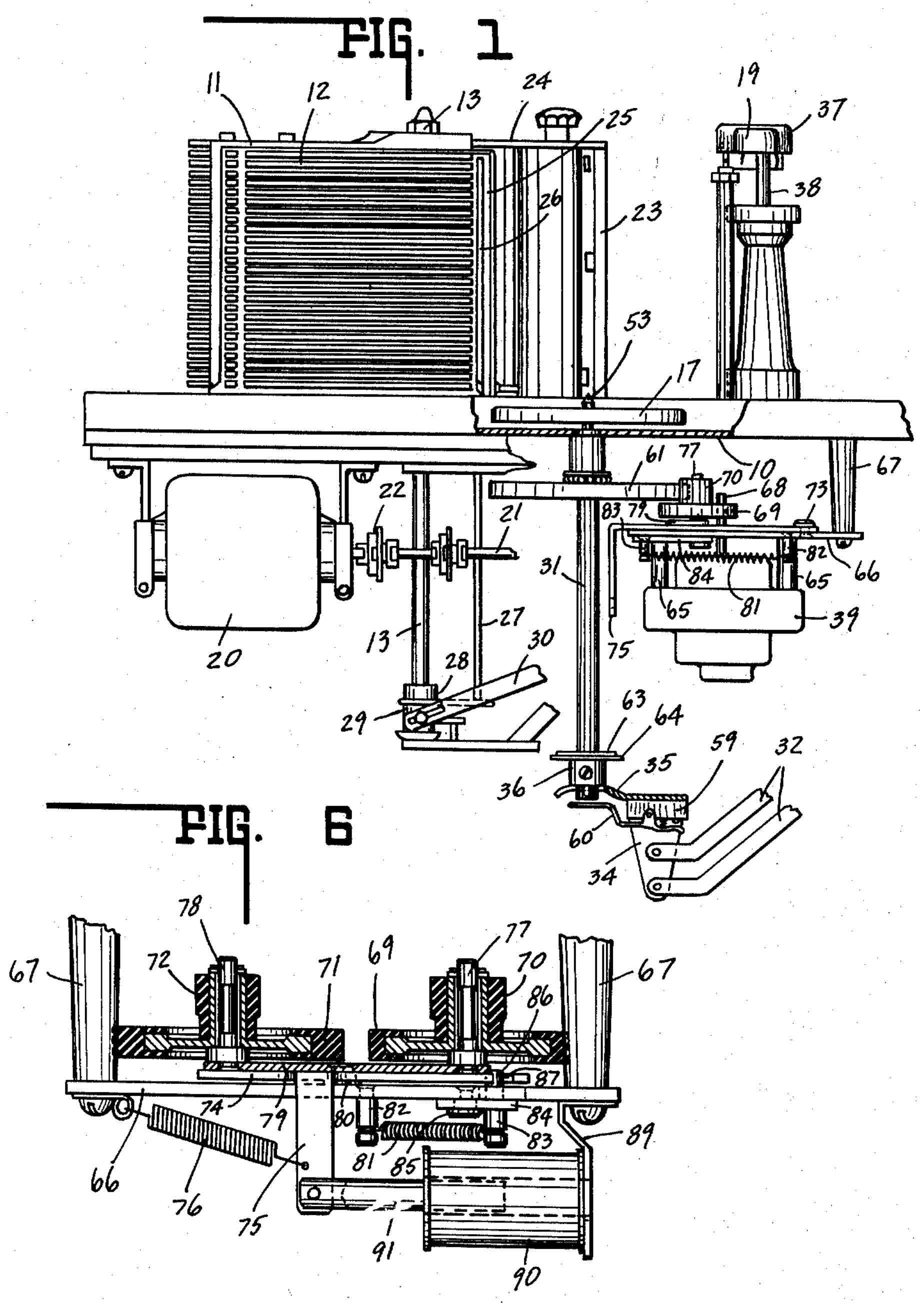
Fig. 1 is a front elevation showing a portion of an automatic phonograph including the record magazine, turntable, and reproducer.
Fig. 6 is a vertical section through the speed changing mechanism with parts in elevation and parts removed.

For the purpose of illustrating one modification of the invention, particularly as applied to an automatic selective record changing phonograph, reference is particularly made to the application of Fred H. Osborne, Serial No. 705,713, filed October 25, 1946, now U. S. Patent No. 2,631,856 entitled "Automatic Phonograph." Such phonograph is further of the type involving the same fundamental principles of operation as shown in Letters Patent No. 2,189,077, granted February 6, 1940 to Howard F. Maurer, entitled "Automatic Phonograph" and in Letters Patent No. 2,002,236 granted to Wilcox May 21, 1935, for "Automatic Phonograph."

As best illustrated in said application for letters patent, there is shown a base plate 10 which supports the record changing mechanism. Mounted above the base plate there is a magazine for the records generally indicated at 11 comprising a series of superimposed swinging record trays 12 pivotally supported one above the other by the post 13 mounted upon the bearing support 14. Said trays are mounted in slightly spaced relation by the bearing supporting collar 15 and spacers 16 so as to be free for swinging movement from the magazine into playing position.

Mounted to one side of the magazine there is provided a turntable 17 of relatively smaller diameter than the record trays 12. Said trays are provided with a central aperture 18 of slightly greater diameter than the turntable so that when the tray is swung to record transfer position the turntable may be elevated to pass through the aperture 18 and pick up the record from the tray for elevation thereof into position to engage the reproducer 19 and be rotated in reproducing engagement therewith.

For swinging the record trays from the magazine to record transfer position above and in axial alignment with the turntable 17, there is provided a record changing motor 20 suspended from the plate 10 for driving the record changing cam shaft 21 through the universal couplings 22. On one side of the magazine there is a bracket 23 secured to and rising from the base plate 10 with its upper end tied to the corresponding end of the bearing post 13 through the plate 24. Pivoted to the post 13 for swinging in an arcuate path there is a yoke 25 which is supported from the top of the post so as to be held against movement axially thereof, and which is provided with a longitudinal slot 26 in which is guided a vertically adjustable coupling finger secured to a vertically adjustable upright rod 27 arising from and supported on the guide member 28 slidably mounted on the lower end of the post 13. Said guide member 28 is carried by a sliding collar 29 slidable upon said post through the action of the record selecting lever 30 which is controlled by the record selecting mechanism, as more particularly set forth and described in said above mentioned application for letters patent and said letters patent.

Thus, through the record selecting mechanism the elevation of the selecting rod 27 causes a selected record tray to be coupled to a transfer mechanism for swinging such tray over the turntable 17 in axial alignment therewith driven by the cam shaft 21 of the motor 20.

Through the mechanism particularly described in said above mentioned application and letters patent, the turntable 17 which is carried on the turntable spindle 31 is elevated throughout the entire height of the magazine for the purpose of engaging a record from the selected record tray irrespective of its relative position of elevation in the magazine, and further elevate such selected record into reproducing engagement with the reproducer 19. This is accomplished through the drive of the cam shaft 21 and suitable cams for swinging the parallel link connections 32 upwardly in timed relation with the positioning of the tray over the turntable, as more particularly set forth in the above mentioned application. Said link connections carry at their free ends a bracket 34 having secured to the upper end thereof a forked finger 35 engageable with the lower end of the collar 36 which is secured to the spindle 31. Due to the parallelogram movement of the link connections 32 as they are raised, the spindle 31 and turntable 17 will be raised to a position above the plane of the uppermost record tray.

As set forth in said above mentioned application, the reproducer 19 carried by the tone arm 37 is caused to swing on the tone arm post 38 upon engagement of the reproducer for following the record grooves in the usual manner.

It is here pointed out that the record changing mechanism herein disclosed, while in all other respects is actuated and controlled as in the above mentioned application, it differs therefrom in one particular. Whereas in said application there is provided one motor for driving both the record changing mechanism and the turntable through the motor shaft, herein the motor 20 through its shaft 21 drives only the record changing mechanism including the swinging of the trays, raising and lowering of the turntable, and the swinging of the reproducer. In this instance the turntable is driven by a separate motor and not by the record changing motor, the turntable driving motor herein being indicated at 39.

Figures 3, 8:
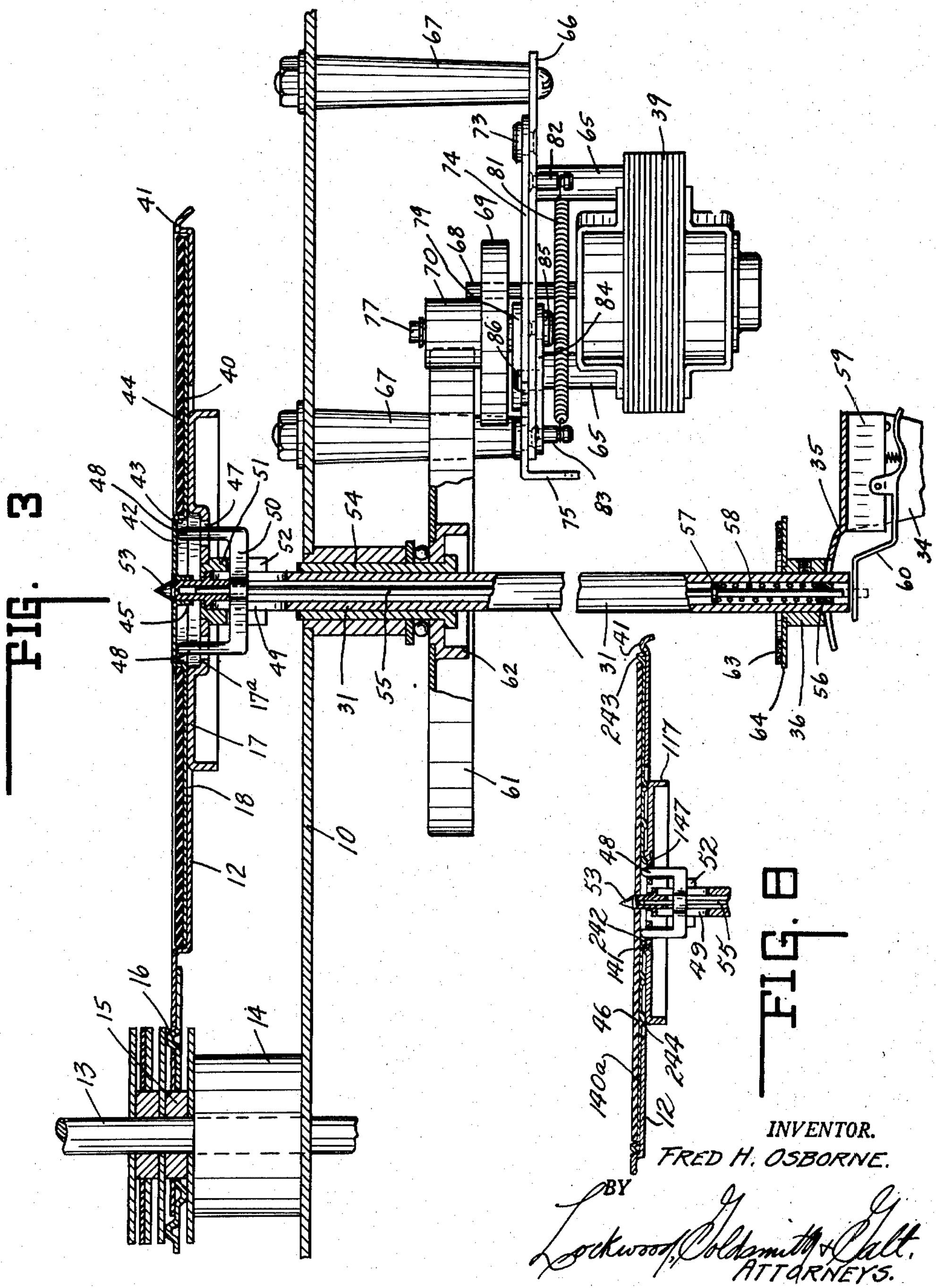
Fig. 3 is a central vertical section through the turntable and associated parts showing a record rotatably carried thereby of the relatively large centering aperture type and with the speed changing mechanism shown in elevation.
Fig. 8 is the same as Fig. 7 showing a modified form of record holder for a second type of record.

Inasmuch as the record tray 12 must have an opening greater than the diameter of the turntable to permit it to pass therethrough, it is customary to provide in machines of this character a record holder in the form of a disk-like plate 40 having an outer diameter substantially that of the tray to seat within the peripheral rim 41 thereof. Said holder has its central portion formed with a central boss 42 to provide a shouldered portion 43 of a prescribed diameter to extend through the centering aperture adjacent the inner periphery thereof provided in a record 44. The record 44 is of that type having the larger diameter aperture to be reproduced at 45 R. P. M. Centrally of the boss 42 there is provided a sleeve 45 extending reversely of the boss and centrally disposed therein. Said sleeve is of a diameter to receive and center that type of record 46 having the smaller centering opening to be reproduced at 33⅓ R. P. M. Thus, the same holder is formed to receive and center one type of record on one side thereof and the other type of record on the opposite side thereof. When the record 44 of the larger aperture is to be loaded in a tray 12, the holder mounts it therein as shown in Fig. 3 with the boss extending upwardly. When the record 46 of a smaller aperture is to be loaded in the tray, the holder is reversed so that the sleeve 45 extends upwardly to center the record.

Figures 4, 5:
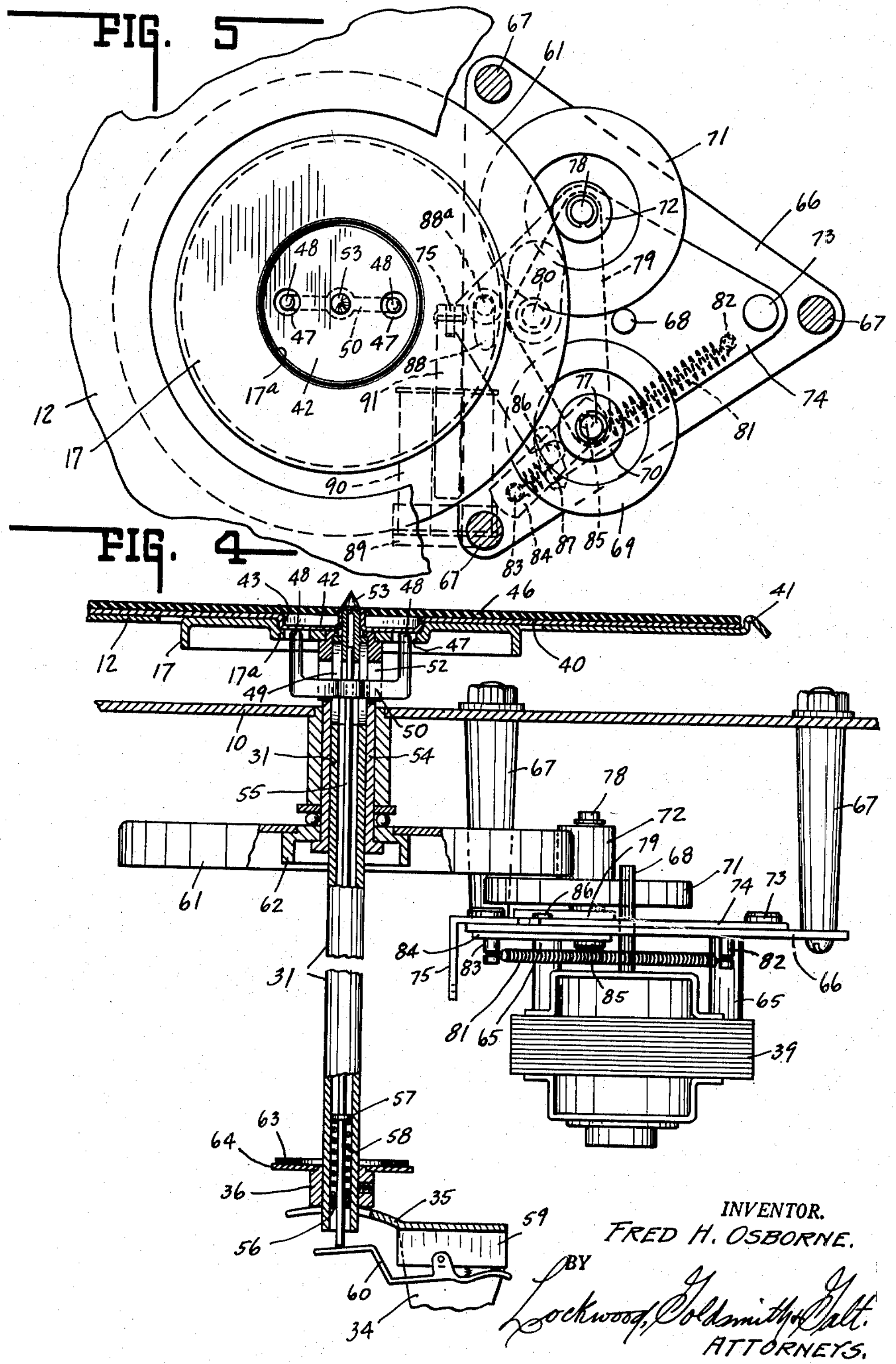
Fig. 4 is the same as Fig. 3 with a turntable carrying a record of the relatively small centering aperture type.
Fig. 5 is a plan view of the speed changing mechanism positioned to rotate the turntable at a speed required for reproduction of the smaller aperture record type shown in Fig. 4.

The turntable is formed centrally thereof with a depression 17*a* conforming to the boss 42 for receiving and seating the boss when in its downwardly extending position as shown in Fig. 4. Within the depression 17*a* there are provided a pair of apertures 47 through which the fingers 48 of the speed changing feeler extend for engagement and positioning by the boss 42. The turntable is mounted for vertical movement and rotation on the spindle 31 which is tubular and which is provided with longitudinal slots 49 at its upper end through which the transverse portion 50 of the feeler extends for relative vertical movement. The mounting for the turntable on the spindle comprises a collar 51 bifurcated at 52 which carries the centering pin 53. The spindle is rotatably and slidably supported upon the base plate 10 by the bearing 54.

Referring to Figs. 3 and 4, the position of the turntable is shown to be above its lowermost position, having been elevated into initial engagement with the holder 40 and its supported record preparatory to raising them from the tray. In the lowermost rest position of the turntable it is sufficiently spaced below the plane of the lowermost tray to permit the tray to be swung into and out of vertical alignment therewith.

Selectively movable within the spindle 31 and extending the full length thereof, there is a feeler rod 55 having its upper bearing in the centering pin 53 and its lower end in the bearing 56 secured within the spindle and through which said rod slides. The feeler rod is secured to the feeler fingers 48 adjacent its upper end and has secured thereto adjacent its lower end a washer 57 against which one end of a compression spring 58 abuts. The other end of said spring seats on the bearing 56 so that the rod 55 will be biased upwardly to the extent of its movement with the upper ends of the fingers 48 slightly spaced from the boss 42 when said boss extends upwardly as shown in Fig. 3. Upon the collar being reversed with the boss 42 nesting in the depression 17a of the turntable as shown in Fig. 4, the feeler will be forced downwardly against the tension of the spring 58 from the position shown in full lines in Fig. 3 to the position shown in dotted lines therein, and as shown in Fig. 4.

Mounted on the bifurcated arm 35 which engages the lower end of the spindle to elevate it, there is a micro-switch 59 carrying a pivoted contact lever 60 extending under the end of the spindle in a position to be engaged by the feeler rod when depressed as shown in Fig. 4. Said switch electrically controls the speed changing mechanism, as will be hereinafter described, causing said mechanism to be shifted from a normal position driving at 45 R. P. M. when the feeler is in the position of Fig. 3 to an actuated position for driving at 33⅓ R. P. M. when the feeler is in the position of Fig. 4. In the former position, the circuit is broken through the switch by the switch lever being in its uppermost position and in the latter position, the circuit is closed when the switch lever 60 is depressed by the feeler rod.

For driving the turntable when in its raised position there is provided a motor driven wheel 61 rotatably carried on the bearing 54. Secured within the wheel 61 for rotation therewith there is a spindle driving cup 62. Said cup is positioned to be frictionally engaged by the friction ring 63 mounted on a spring driving disk 64 secured to the collar 36 on the spindle. Upon the cup 62 being rotated through the friction wheel 61, and the turntable being elevated to its extreme upper position, the friction ring 63 will be brought into driving engagement with said cup for rotating the spindle and turntable. Thus, the turntable is only rotated when in its uppermost position, and remains stationary for receiving and releasing a record.

Figure 2:
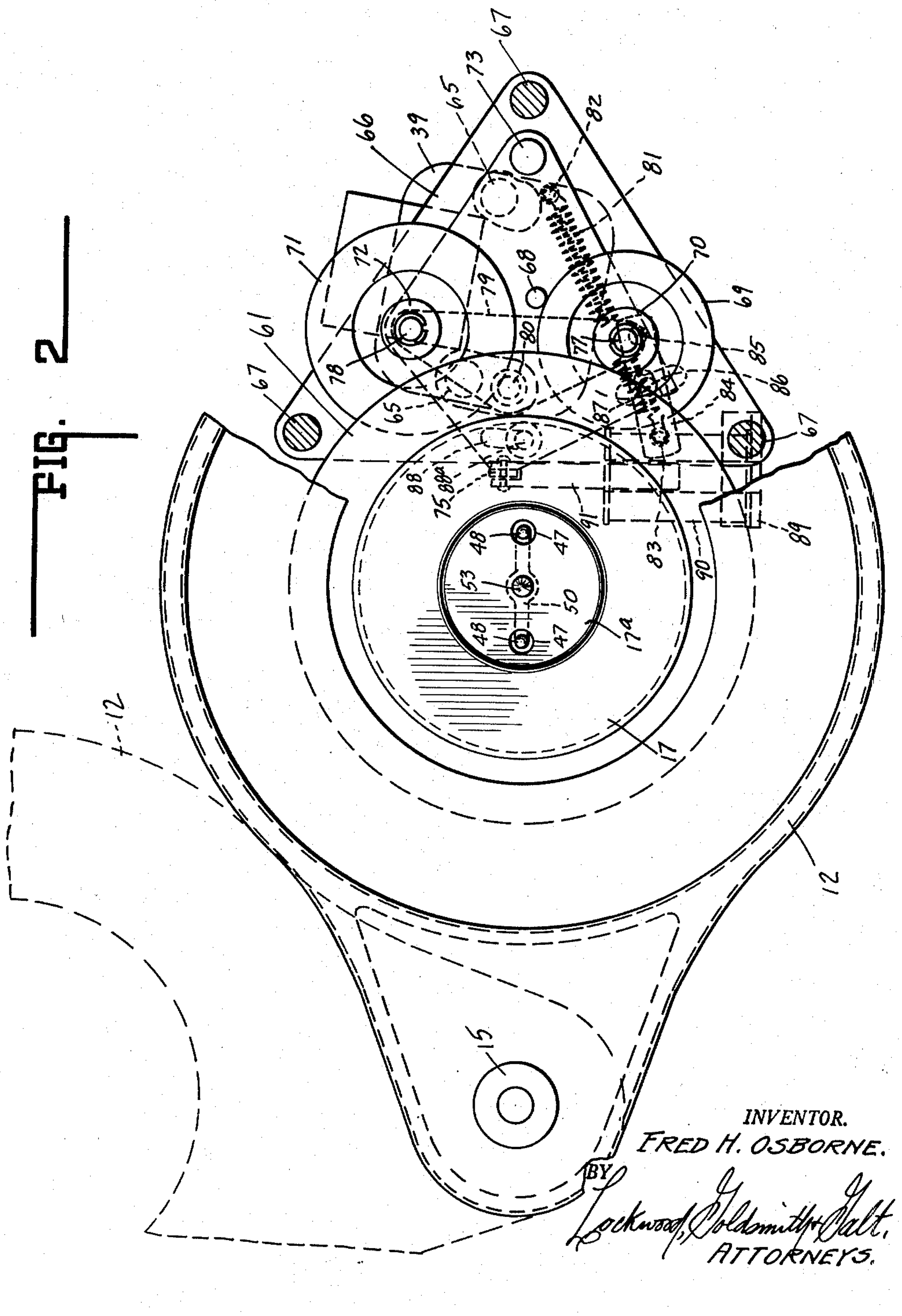
Fig. 2 is a plan view of a record magazine tray and record support with parts broken away to expose the speed changing mechanism and positioned to drive the turntable at the required speed for the larger apertured record as shown in Fig. 3.

The wheel 61 is driven through a speed changing mechanism from the motor 39 which is suspended through the spacer bolts 65 from a mounting plate 66 which is in turn suspended by the rods 67 from the base plate 10. In its normal driving position the driving spindle 68 of the motor is in frictional driving engagement with an idler friction wheel 69 having a stepped down friction roller 70 adapted to engage and frictionally drive the wheel 61, all as illustrated in Figs. 2 and 3. Through this driving chain the turntable may be driven at 45 R. P. M. in accordance with the required reproducing speed of the record 44.

A similar drive is provided for driving the turntable at 33⅓ R. P. M., the reproducing speed of the record 46. This second driving chain is shown in Figs. 4 and 5, wherein the friction wheel 71 is shifted to driving engagement with the spindle 68, and through its friction roller 72 drives the wheel 61. This speed changing mechanism operably connects the turntable motor with the turntable at its uppermost position through engagement with the friction ring 63 with the spindle driving cup 62, the respective friction wheels 69 and 71, and their respective rollers being automatically shifted into and out of driving position through the feeler element 48, 55 and record holder 40 according to the physical characteristic of the particular record.

For this purpose, the plate 66 has pivotally mounted thereon at 73 a shifting plate 74 having a downwardly extending arm 75 yieldingly biased by the tension spring 76 in a direction to swing the shifting plate 74 to engage the friction wheel 69 with the spindle 68 and its roller 70 with the wheel 61 (Figs. 2, 3, and 6). The wheel 69 and 71 are rotatably mounted on the bearing studs 77, 78, respectively, said studs being fixedly secured to a carrier plate 79 pivoted at 80 on the shifting plate 74. The friction wheels 69, 71 are thereby rotatably supported in spaced relation to each other while permitted to jointly swing about the pivot 80 to be shifted into and out of driving position.

For yieldingly retaining the shifting plate 74 in its full shifting position there is provided an overcenter tension spring 81 having one end connected to the fixed stud 82 extending downwardly from the supporting plate 66 and the other end connected with the stud 83 mounted on a pivoted arm 84 pivoted at 85 to the underside of the plate 66. Said arm is provided with a stud 86 slidably embraced within a recess 87. As the plate 74 is shifted from one driving position to another about its pivotal mounting 73, it shifts the pivoted overcentered arm 84, through the medium of the pin 86 and the tension spring 81, from one side to the other of its pivotal mounting 85. Thus, said spring has a tendency to draw the wheel 71 into driving engagement under spring tension when shifted to one position and the wheel 69 into driving engagement under spring tension when shifted to the opposite position.

For steadying the free end of the shifting plate adjacent its shifting arm 75, the supporting plate 66 is provided with an arcuate slot 88 in which a sliding anchor rivet 88a extends, said rivet being secured to and carried by the free shifting end of the shift plate. Suspended from the supporting plate 66 by the bracket 89 there is a solenoid 90 having its plunger 91 pivotally connected to the depending arm 75 on the shifting plate, said plunger working against the tension of spring 76. The solenoid is electrically connected in a circuit including a suitable source of power and the switch 35. Upon the solenoid being energized when the switch is closed by the downward thrust of the feeler rod 55, it shifts the plate 74 to swing the friction wheel 71 out of driving engagement and the wheel 69 into driving engagement. When the feeler is returned to normal position by its spring 58, the switch 35 breaks the circuit, deenergizing the solenoid and permitting spring 76 to return the shifting plate 74 to its normal position to thereby swing the wheel 71 out of driving engagement and return wheel 69 into driving engagement.

In operation, the phonograph is automatically controlled other than its turntable drive as in the above mentioned application and letters patent. When the turntable engages a record of such physical characteristic as not to affect the feeler, the record will be rotated at normal speed through the wheel 69 upon being elevated to its uppermost position, the normal speed being shown herein as 45 R. P. M. (Figs. 1, 2 and 3). This is due to the elevated position of the feeler rod 55 wherein the feeler fingers 48 freely extend into the boss of the holder for the record 44 having the larger aperture. In this position the feeler switch 59 is open, solenoid 90 deenergized, and the drive is held under tension of spring 76 to position the friction wheel 71 and its roller 72 in frictional engagement with the motor spindle 68 and the wheel 61 respectively.

When, due to the physical characteristic of a record provided with a relatively small aperture, as in record 46, the adjacent portion of the record or its holder is engaged by the feeler fingers 48 to depress the rod 55 against tension of the spring 58 to close switch 59 and energize solenoid 90 which acts to shift plate 74 to a position for engaging the wheel 71 and its roller 72 with the motor spindle 68 and friction wheel 61 for changing the driving speed of the turntable to that speed required for reproducing such record, herein shown as 33⅓ R. P. M.

Figure 7:
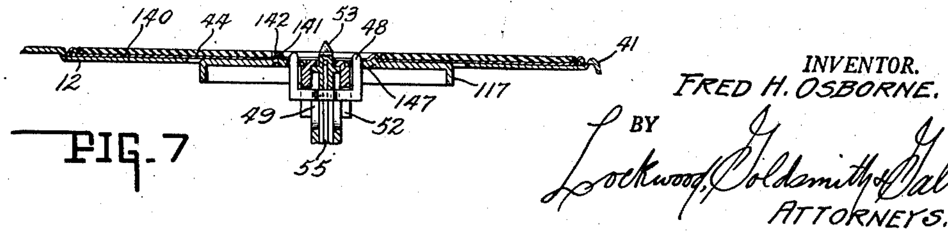
Fig. 7 is a sectional illustration showing a modified form of record holder for one type of record.

In the modified form of the invention, as shown in Figs. 7 and 8, there is provided two different forms of record holders 140 and 140*a* respectively, the holder 140 adapted to receive record 44 with the relatively large aperture, whereas the holder 140*a* is adapted to receive record 46 having the relatively small aperture. The turntable 117 is provided in the central portion thereof with an upstanding annular centering bead 141 adapted to extend into and interlock with an upstanding nesting bead 142 provided on the holder. The bead 142 of the holder extends into the enlarged aperture of the record 44 for centering the record on the holder, whereas the holder is centered on the turntable by the interlocking bead 141. The turntable is provided with apertures 147 through which the fingers 48 of the feeler extend. Thus, with a record having such physical characteristics as not to interfere with the normal raised position of the feeler fingers, the circuit to the solenoid 90 will be broken through the switch 59 as above described so that record 44 will be reproduced at a predetermined speed such as 45 R. P. M.

When it is desired to reproduce a record at a different speed and with a different physical characteristic such as the relatively smaller aperture in record 46, a different holder is used, such as the holder 140*a* in Fig. 8. This holder is provided with a downwardly turned annular flange 242 which interlocks in centering relation with the centering bead 141 of the turntable to thereby center the holder on the turntable, the record being peripherally centered therein by the peripheral beads 243. For supporting and steadying the holder on the turntable when it is picked up for rotation, it is provided with a pair of spacing friction rings 242. Upon the turntable being raised into pickup engagement with the holder 140*a*, the feeler fingers 48 will engage the inner portion of the record 46 which spans the aperture of the holder, and be depressed thereby for closing the circuit through the switch 59 to the solenoid 90 and thereby shift the speed changing mechanism to a different predetermined driving speed such as 33⅓ R. P. M.

Inasmuch as the light weight of the record 46 has the physical characteristic of engaging and depressing the feeler, in this modification, the spring 58 normally urging the feeler upwardly may be dispensed with and the feeler held in its upward position against the influence of gravity by the spring pressed switch arm 60. Furthermore, such record 46 may have a further physical characteristic relative to the record 44 wherein it is of greater weight for effecting the downward thrust of the feeler.

The invention claimed is:

1. In a phonograph including a rotatable turntable adapted to receive records having their respective central apertures of different diameters, said turntable being formed with a central depressed portion, the combination therewith of a record holder formed with a central boss adapted to nest within said depressed portion of the turntable when in one position thereon and extend upwardly therefrom when in its reversed position thereon, said boss being formed to receive and center a record having a larger aperture when in said last mentioned position and being provided with a reversely extending sleeve to receive and center a record having a smaller aperture when in turntable nesting position, a turntable motor, a turntable drive mechanism normally operable by said motor to rotate said turntable at one speed and shiftable to rotate said turntable at a different speed, and a feeler element associated with said turntable and mechanism normally ineffective upon said turntable receiving a record and holder with the boss of the latter extending upwardly from the turntable and adapted to be engaged and depressed by the boss of said holder when nesting within the depression of the turntable for shifting said mechanism from its normal turntable driving speed to a different predetermined driving speed.

2. In a phonograph including a rotatable turntable, and a driving spindle therefor terminating with a centering pin extending thereabove, said turntable being formed with an apertured depression surrounding said centering pin, the combination therewith of a record holder formed with a central boss adapted to nest within said depression to extend over the aperture therein and a central upstanding sleeve adapted to surround and be centered by said centering pin, a turntable motor, a turntable drive mechanism normally operable by said motor to drive said spindle at a predetermined rotative speed and shiftable to a position for driving said spindle at a different predetermined rotative speed, a control rod extending through said spindle operable to shift the position of said mechanism from its normal driving speed to its different driving speed when in depressed position and being ineffective to shift said mechanism when in its elevated position, and a feeler carried by said rod extending through the aperture in said turntable adapted to be engaged for depressing said rod by a holder received by said turntable with its boss nesting in the depression thereof and being free of engagement upon a holder being received by said turntable in reverse position with its boss extending upwardly in opposed relation to its depression whereby said mechanism will rotate the turntable at its normal driving speed.

3. In an automatic selective record changer for phonographs of the type comprising a magazine of swinging record carrying trays wherein a selected tray is positioned over the turntable for causing the record thereon to be engaged and elevated into record producing position characterized by the turntable having a central apertured depression formed therein and a motor for rotating said turntable when in raised reproducing position, the combination therewith of a speed changing mechanism adapted to operably connect said motor and turntable for driving the latter at a predetermined speed and shiftable to a position for driving the turntable at a different predetermined speed, a record holder having a central boss associated with each record of larger aperture to extend upwardly therethrough and associated with each record of smaller aperture to extend downwardly therefrom, said boss when in the latter position being adapted to nest within said turntable recess, a feeler element normally extending through the aperture of said turntable recess upwardly into said boss when associated with the record of larger aperture and adapted to be engaged and depressed by said boss when extending downwardly in nesting relation with the recess of said turntable, and means actuated by the depression of said feeler element for shifting said speed changing mechanism from its normal turntable driving speed for reproduction of a record of the first mentioned type to a different turntable driving speed for reproduction of a record of the second mentioned type.

FRED H. OSBORNE.

References Cited in the file of this patent

UNITED STATES PATENTS

| Number | Name | Date |
|---|---|---|
| 2,113,401 | Goldsmith | Apr. 5, 1938 |
| 2,243,698 | Freborg et al. | May 27, 1941 |
| 2,262,731 | Gruber et al. | Nov. 11, 1941 |